Nov. 25, 1930.  E. M. GURNEY  1,782,873
CIRCULATION REGULATOR FOR HEATING SYSTEMS
Filed Oct. 1, 1929
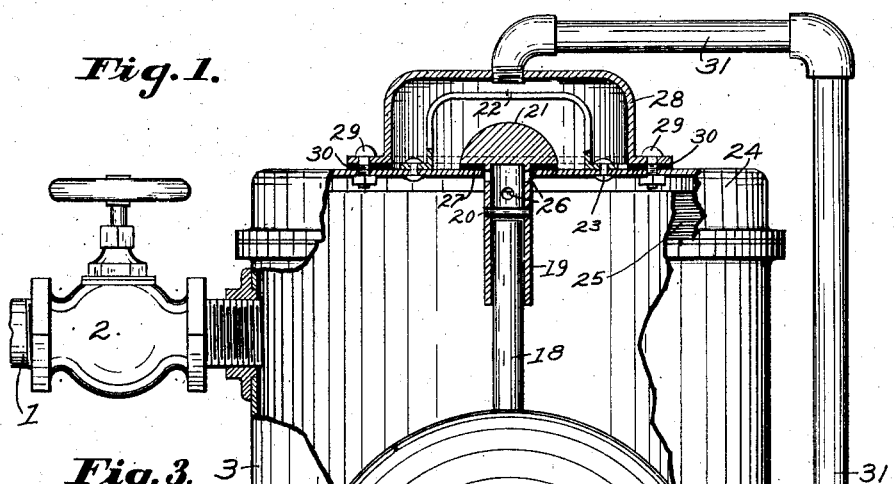
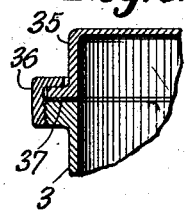
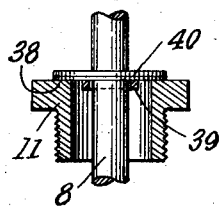
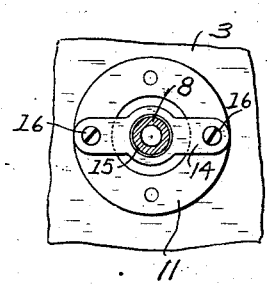
Estelle M. Gurney
INVENTOR
BY J. M. Wilson
ATTORNEY Patented Nov. 25, 1930

1,782,873

UNITED STATES PATENT OFFICE

ESTELLE M. GURNEY, OF NEW YORK, N. Y.

CIRCULATION REGULATOR FOR HEATING SYSTEMS

Application filed October 1, 1929. Serial No. 396,551.

This invention relates to traps used in separating condensates from gases and more particularly to devices adapted for use in connection with apartment house heating systems where steam is employed as the heating medium, so that the effluent from the radiators is passed as a liquid into a drain.

It is one object of the present invention to provide a trap that will operate automatically under such pressure as is commonly used in steam heating systems to deliver water from the condensed steam to a drain or the like.

A further feature is in the provision of an apparatus which requires no care or superintendence in its operation after installation.

Another purpose is to provide a trap in which means are provided to prevent scale, grip and like particles, that may find their way therein, from entering the valves.

These and other advantageous objects, which will later appear, are accomplished by the novel construction and combination of parts hereinafter disclosed and illustrated in the accompanying drawing, constituting an important part of this disclosure, and in which:

Figure 1 is a partial side elevational, partial vertical sectional view of an embodiment of the invention.

Figure 2 is a fragmentary transverse sectional view taken on line 2—2 of Fig. 1.

Figure 3 is a fragmentary sectional view showing the trap chamber, cover and clamp, with modifications.

Figure 4 is a sectional view of the lower float guide stem support, also slightly modified.

An inlet pipe 1, leading from the radiator discharge header or the like, is controlled by a globe valve 2 having a nipple engaged in a flange fixed on the upper portion of the wall of a cylindrical tank constituting the trap chamber 3.

A valve 4 controls the passage of water from the chamber 3 to a discharge pipe 5, the valve being automatically raised and lowered by movement of a hollow spherical float 6 within the chamber 3, the valve having an annular ring 7 to act cooperatively with a seat and is connected with the float guide 8 by a threaded stem 9.

The valve is slidably engaged in a valve casing composed of an upper member 10 clamped to the bottom of the tank 3 by a hollow flanged screw 11. The lower member 12 of the valve casing is connected to the upper member 10 by screw threads 13.

A plate 14, having an opening 15 through which the float guide 8 freely passes, is secured by screws 16 to the flanged portion of the screw 11 and gaskets 17 are provided on each side of the tank flooring, clamp screw 11 and upper end of the valve casing member 10.

A drain plug 34 is set in the tank flooring through which sediment may be blown off at any desirable time and it is to be noted that, due to the raised flange of the clamp screw 11, such sediment will be prevented from entering the valve chamber unless an undue amount collects.

Fixed in the float 6 directly opposite the guide stem 8, is another stem 18 freely operable in a guide sleeve 19, the stem, upon rising of the float, contacting with a pin 20 fixed transversely in the sleeve which extends downwardly from a convex head 21 disposed above the cover 24 and which constitutes a gravity valve.

The head 21 is limited in its upward movement by striking against a bent rod 22 held at its end by rivets 23 on the upper side of the cover 24, the down turned portion of which is screw threaded to the top of the tank as at 25.

A series of holes 26 are made in the wall of the sleeve 19, and between the under side of the head and cover is a packing 27.

Disposed over the stop rod 22 is an inverted cup 28 held by bolts 29 to the cover 24, while therebetween is a gasket 30.

Leading outwardly from the cup 28 is a pipe 31 connecting with a T fitting 32 on the discharge pipe 5, so that any condensation finding its way from the tank, through the holes 26, to the space within the inverted cup 28, will be conducted to the discharge pipe in an obvious manner, the holes acting as a safety device to prevent any possible accumulation of steam pressure. A weight may be hung on the hook 33, attached to the valve 4, if desired, to adjustably control the lifting of the float 6.

In Fig. 3 a modification is shown in which a cover 35 is provided over the float chamber 3, both tank and cover being outwardly flanged and the former screw threaded to receive a clamp ring 36, suitable gaskets 37 being interposed at the point between the flanges.

Figure 4 shows a slight modification in which the screw 11 has resting on it a plate having a down reaching collar 39, and disposed on its upper lever surface is a disc 40, preferably of leather, through the center of which the stem 8 passes.

In operation, water and steam from the radiator enters the chamber 3 through the valve 2, and upon accumulating in the chamber eventually raises the float 6, thus opening the discharge valve 4.

Meanwhile the steam in the upper part of the chamber enters the holes in the sleeve 19, and, as the float rises, the head 21 rises, permitting the escape of saturated steam into the cup 28 and thence, via the pipe 31, to the discharge pipe 5.

Thus the float operates to control the educt of both steam and water simultaneously and automatically.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. An automatic trap comprising a casing having an inlet, an outlet for water provided with a valve, a steam and air outlet at the top of said casing, a gravity valve controlling the steam outlet, a perforate sleeve on the gravity valve open to the casing permitting excessive pressure to raise the valve, means for limiting the raising of the valve, a cap over the valve connected with said outlet below the valve therein, a float operable in said casing, said float having a lower stem engaged with outlet valve, and an upper stem slidable in said sleeve to raise the gravity valve simultaneously with said outlet valve.

2. An automatic trap comprising an upright cylindrical casing having an inlet near its top, a liquid outlet in the bottom, a gas outlet in the top, a valve for each outlet, a float in said casing, means carried by said float to raise both valves simultaneously, means to limit the rise of said valves, and means for weighting said float.

3. An automatic trap comprising an upright cylindrical casing having an inlet near its upper end, a valved outlet in its bottom, an escape valve in its upper end, said valve having an inreaching sleeve containing perforations, an inverted cup over said escape valve open to said outlet, means to prevent sediment from entering the outlet valve, means for the escape of sediment, a globular float having opposed stems, and a guide for the lower stem, said stem being directly connected to the outlet valve and said upper stem slidably engaged in said sleeve whereby the movement of said float is transmitted to both valves simultaneously.

4. An automatic trap comprising an upright cylindrical casing having an inlet near its upper end, a valved outlet in its bottom, an escape valve in its upper end, said valve having an inreaching sleeve containing perforations, an inverted cup over said escape valve open to said outlet, a float having upper and lower stems, the lower stem communicating motion to the outlet valve and the upper stem to raise said escape valve, means for ventilating the escape valve open to said casing, and means over said escape valve to limit the rise of both of said valves.

In testimony whereof I have hereunto affixed my signature.

ESTELLE M. GURNEY.